US009047001B2

(12) United States Patent
Homma et al.

(10) Patent No.: US 9,047,001 B2
(45) Date of Patent: Jun. 2, 2015

(54) INFORMATION PROCESSING APPARATUS, INFORMATION PROCESSING METHOD, AND PROGRAM

(75) Inventors: Fuminori Homma, Tokyo (JP); Ikuo Yamano, Tokyo (JP); Shunichi Kasahara, Kanagawa (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 147 days.

(21) Appl. No.: 13/474,831

(22) Filed: May 18, 2012

(65) Prior Publication Data

US 2012/0299851 A1    Nov. 29, 2012

(30) Foreign Application Priority Data

May 26, 2011   (JP) .................................. 2011-117990

(51) Int. Cl.
*G06F 3/041* (2006.01)
*G06F 3/0488* (2013.01)

(52) U.S. Cl.
CPC .................................. *G06F 3/0488* (2013.01)

(58) Field of Classification Search
USPC .................................................. 345/173–183
See application file for complete search history.

(56) References Cited

U.S. PATENT DOCUMENTS

| 8,723,811 | B2 * | 5/2014 | Kim et al. ..................... 345/173 |
| 2009/0309851 | A1 * | 12/2009 | Bernstein ....................... 345/174 |
| 2009/0315848 | A1 * | 12/2009 | Ku et al. ......................... 345/173 |
| 2011/0115742 | A1 * | 5/2011 | Sobel et al. .................... 345/174 |
| 2011/0157233 | A1 * | 6/2011 | Kitagawa ...................... 345/660 |

FOREIGN PATENT DOCUMENTS

JP    2008-117371    5/2008

* cited by examiner

*Primary Examiner* — Kenneth B Lee, Jr.
(74) *Attorney, Agent, or Firm* — Sherr & Jiang, PLLC

(57) ABSTRACT

There is provided an information processing apparatus including a determination section for determining whether or not an input operation is valid on the basis of a proximity distance and a target object, and a process execution section for executing a process according to the input operation when it is determined that the input operation is valid. The proximity distance is a distance between a proximity detection type operation unit and an operating body performing the input operation using the proximity detection type operation unit. The target object is a target of the input operation.

13 Claims, 13 Drawing Sheets

FIG. 10
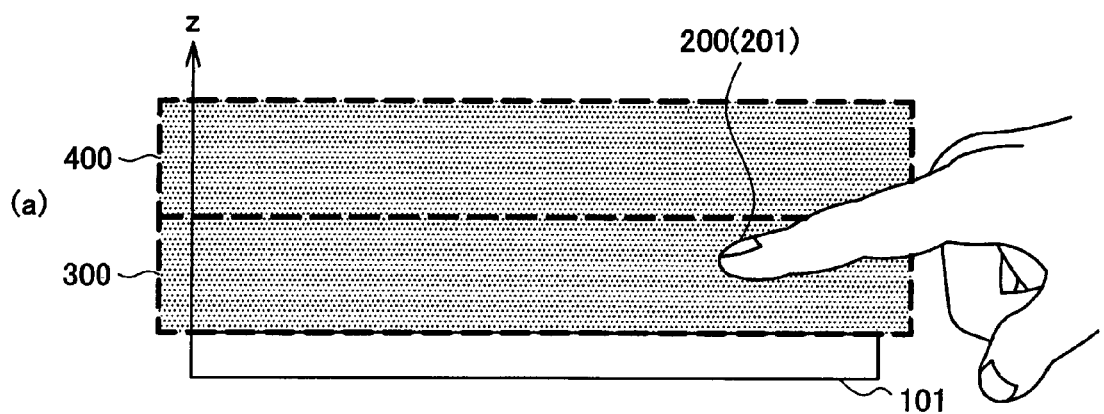
(a)
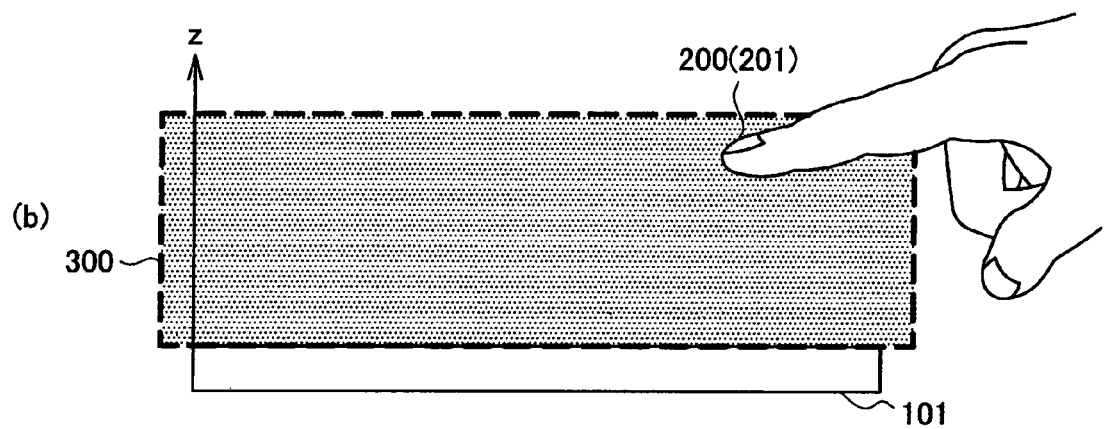
(b)

INFORMATION PROCESSING APPARATUS, INFORMATION PROCESSING METHOD, AND PROGRAM

BACKGROUND

The present disclosure relates to an information processing apparatus, an information processing method, and a program.

For example, an information processing apparatus which is provided with a proximity detection type touch panel is described in Japanese Patent Application Laid-Open Publication No. 2008-117371. The proximity detection type touch panel can detect a hover operation performed by a user' hand even if the user's hand is away from the proximity detection type touch panel. The information processing apparatus determines the hover operation as being valid if a proximity distance, i.e., a distance between the proximity detection type touch panel and the user's hand is within a predetermined threshold value.

SUMMARY

However, since the threshold value is fixed to a very small value in an information processing apparatus in the related art, it has been necessary for the user's hand to sufficiently approach the proximity detection type touch panel each time any hover operation is performed. Therefore, it is desirable to provide a technique for improving the operability of the proximity detection type touch panel.

According to an embodiment of the present disclosure, there is provided an information processing apparatus including a determination section for determining whether or not an input operation is valid on the basis of a proximity distance and a target object, and a process execution section for executing a process according to the input operation when it is determined that the input operation is valid, the proximity distance is a distance between a proximity detection type operation unit and an operating body performing the input operation by using the proximity detection type operation unit, and the target object is a target of the input operation.

According to the present disclosure, there is provided an information processing method including determining whether or not an input operation is valid on the basis of a proximity distance and a target object, and executing a process according to the input operation when it is determined that the input operation is valid, the proximity distance is a distance between a proximity detection type operation unit and an operating body performing the input operation by using the proximity detection type operation unit, and the target object is a target of the input operation.

According to the present disclosure, there is provided a program enabling a computer to realize a determination function of determining whether or not an input operation is valid on the basis of a proximity distance and a target object, and a process execution function of executing a process according to the input operation when it is determined that the input operation is valid, the proximity distance is a distance between a proximity detection type operation unit and an operating body performing the input operation by using the proximity detection type operation unit, and the target object is a target of the input operation.

According to the present disclosure, a proximity distance where an input operation is determined as being valid, that is, a detectable distance can be adjusted according to a target object.

As described above, according to the present disclosure, since a detectable distance is adjusted according to a target object, the operability of a proximity detection type operation unit such as a proximity detection type touch panel is improved.

BRIEF DESCRIPTION OF THE DRAWINGS

FIG. 10(a) is a side view illustrating a valid region in a case where a target object is small; FIG. 10(b) is a side view illustrating a valid region in a case where a target object is large;

DETAILED DESCRIPTION OF THE EMBODIMENT(S)

Figure 1:
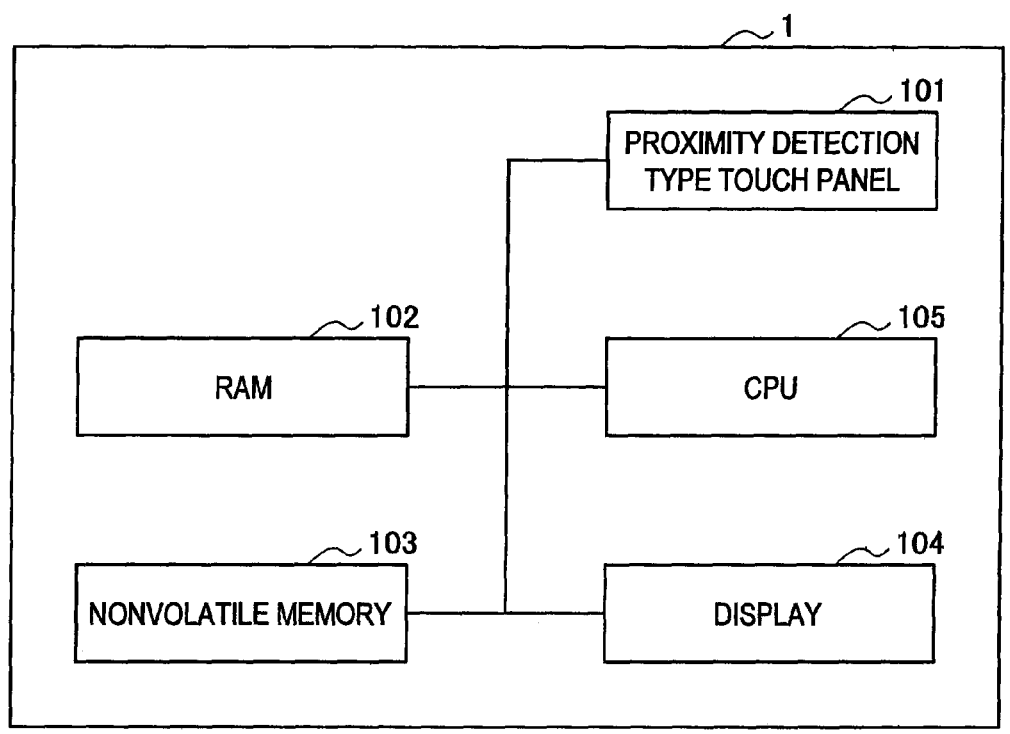
FIG. 1 is a hardware configuration diagram illustrating an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order.

1. Configuration of Information Processing Apparatus
  1-1. Hardware Configuration of Information Processing Apparatus
  1-2. Consideration on Information Processing Apparatus in the Related Art
  1-3. Functional Block of Information Processing Apparatus
2. Procedures of Process Performed by Information Processing Apparatus
  1. Configuration of Information Processing Apparatus
  1-1. Hardware Configuration of Information Processing Apparatus A hardware configuration of an information processing apparatus 1 will be described with reference to FIG. 1 and the like. The information processing apparatus 1 includes a proximity detection type touch panel 101, a RAM 102, a nonvolatile memory 103, a display 104, and a CPU 105.

Figure 2:
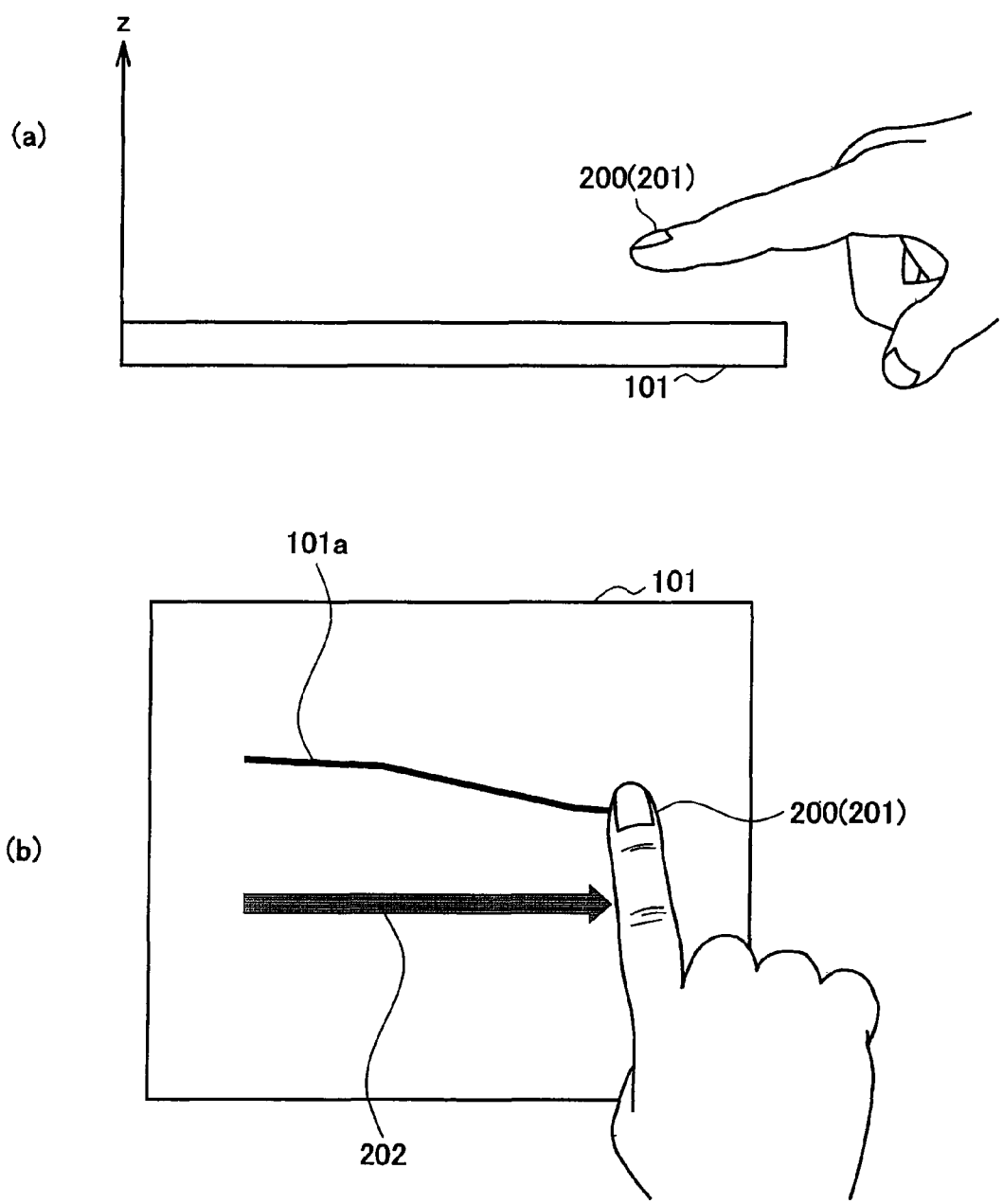
FIG. 2(a) is a side view illustrating a case where a proximity detection type touch panel detects an operating body (a user's finger tip)
FIG. 2(b) is a plan view illustrating a case where the proximity detection type touch panel detects an operating body.
Figure 3:
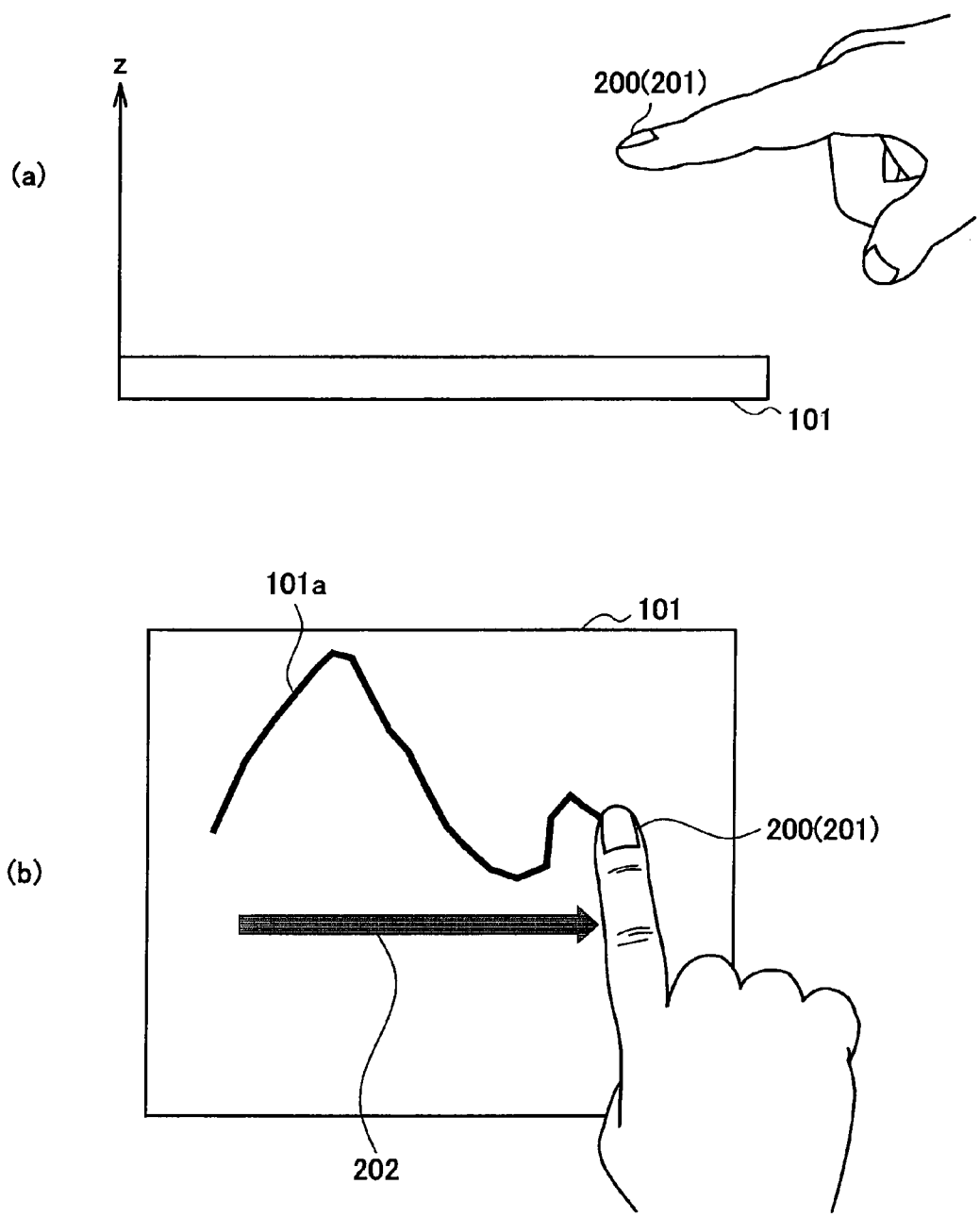
FIG. 3(a) is a side view illustrating a case where a proximity detection type touch panel detects an operating body.
FIG. 3(b) is a plan view illustrating a case where the proximity detection type touch panel detects an operating body.

The proximity detection type touch panel 101 is, for example, a capacitive proximity detection type touch panel. The proximity detection type touch panel 101, as shown in FIGS. 2 and 3, can detect an input operation such as a hover operation even if an operating body 200 is away from the proximity detection type touch panel 101. Here, the hover operation refers to an operation of moving the operating body 200 at a position where the operating body 200 approaches the proximity detection type touch panel 101. The hover operation is also referred to as a gesture operation. In addition, the operating body 200 is an object performing the hover operation, and is, for example, a user's hand (specifically, a finger tip 201 or a palm), a touch pen, or the like.

Detection elements are disposed at each part of the proximity detection type touch panel 101. In addition, the xyz space is configured in the proximity detection type touch panel 101. The x-y plane is parallel to the proximity detection type touch panel 101, and the z axis is perpendicular to the proximity detection type touch panel 101.

The proximity detection type touch panel 101 performs the following processes in detail. The proximity detection type touch panel 101 detects an object approaching the proximity detection type touch panel 101, for example, on the basis of a variation amount of the capacitance of each detection element. Further, the proximity detection type touch panel 101 detects a distance between each portion of the object and the proximity detection type touch panel 101, that is, a proximity distance. In addition, the proximity detection type touch panel 101 regards a portion whose proximity distance is in a predetermined range from the minimum value (for example, in a range of the minimum value +1 cm or less) of the detected object as the operating body 200. Thus, when the user's finger tip 201 approaches the proximity detection type touch panel 101, the proximity detection type touch panel 101 can detect the finger tip 201 as the operating body 200 and regard the other portions (for example, the base of the finger) as noise for exclusion.

In addition, the proximity detection type touch panel 101 detects a projection region of the operating body 200, a horizontal position of the operating body 200, and a proximity distance of the operating body 200. Here, the projection region of the operating body 200 is a region obtained by projecting the operating body 200 onto the proximity detection type touch panel 101. The horizontal position of the operating body 200 is a position on the x-y plane of the operating body 200. The proximity detection type touch panel 101 detects horizontal positions regarding the respective portions of the operating body 200 and arithmetically averages the detected values, thereby obtaining the horizontal position of the operating body 200. The proximity distance of the operating body 200 is a distance between the proximity detection type touch panel 101 and the operating body 200, and is given by the z coordinate. The proximity detection type touch panel 101 detects proximity distances regarding the respective portions of the operating body 200 and arithmetically averages the detected values, thereby obtaining the proximity distance of the operating body 200.

The proximity detection type touch panel 101 provides the CPU 104 with detection information, which is in regard to the projection region of the operating body 200, the horizontal position of the operating body 200, and the proximity distance of the operating body 200.

The detection accuracy of the proximity detection type touch panel 101 depends on a proximity distance. For example, as shown in FIG. 2(a) and FIG. 2(b), when the user moves the finger tip 201 in the direction of arrow 202 at a position in which the finger tip is away from the proximity detection type touch panel 101 by 1 to 2 cm, a trajectory 101a of the detection position nearly matches with the actual trajectory of the finger tip 201. Here, the detection position is a horizontal position of the operating body 200 detected by the proximity detection type touch panel 101. That is to say, the proximity detection type touch panel 101 can accurately detect the movement of the finger tip 201. In addition, the detection positions are constant, and thus detection information provided from the proximity detection type touch panel 101 has little noise.

On the other hand, as shown in FIG. 3(a) and FIG. 3(b), when the user moves the finger tip 201 in the direction of arrow 202 at a position away from the proximity detection type touch panel 101 by 4 to 5 cm, a trajectory 101a of the detection position is deviated from the actual trajectory of the finger tip 201. That is to say, the detection accuracy of the proximity detection type touch panel 101 is lower than that in the case of FIG. 2. In addition, the detection positions are not constant, and thus the detection information provided from the proximity detection type touch panel 101 has much noise.

The RAM 102 is used as a work region of the CPU 105. The nonvolatile memory 103 stores information necessary for the CPU 105 to perform processes, such as a program and a variety of image and audio information. The display 104 outputs (presents) a variety of image and audio information given by the CPU 105.

1-2. Consideration on Information Processing Apparatus in the Related Art

The present inventors have developed the information processing apparatus 1 according to the present disclosure through consideration on an information processing apparatus in the related art. Therefore, the consideration performed by the present inventors will be described. For this, problems of the information processing apparatus in the related art will be described using the above-described hardware configuration. As described above, in the proximity detection type touch panel 101, the longer the proximity distance is, the lower the detection accuracy is. Thus, in the information processing apparatus in the related art, an operator side sets a threshold value (i.e., a detectable distance), and any detection information provided from the proximity detection type touch panel 101 is filtered as noise when a proximity distance exceeds the threshold value. The valid range 300 shown in FIG. 4(a) and FIG. 4(b) corresponds to the threshold value described above.

Figure 4:
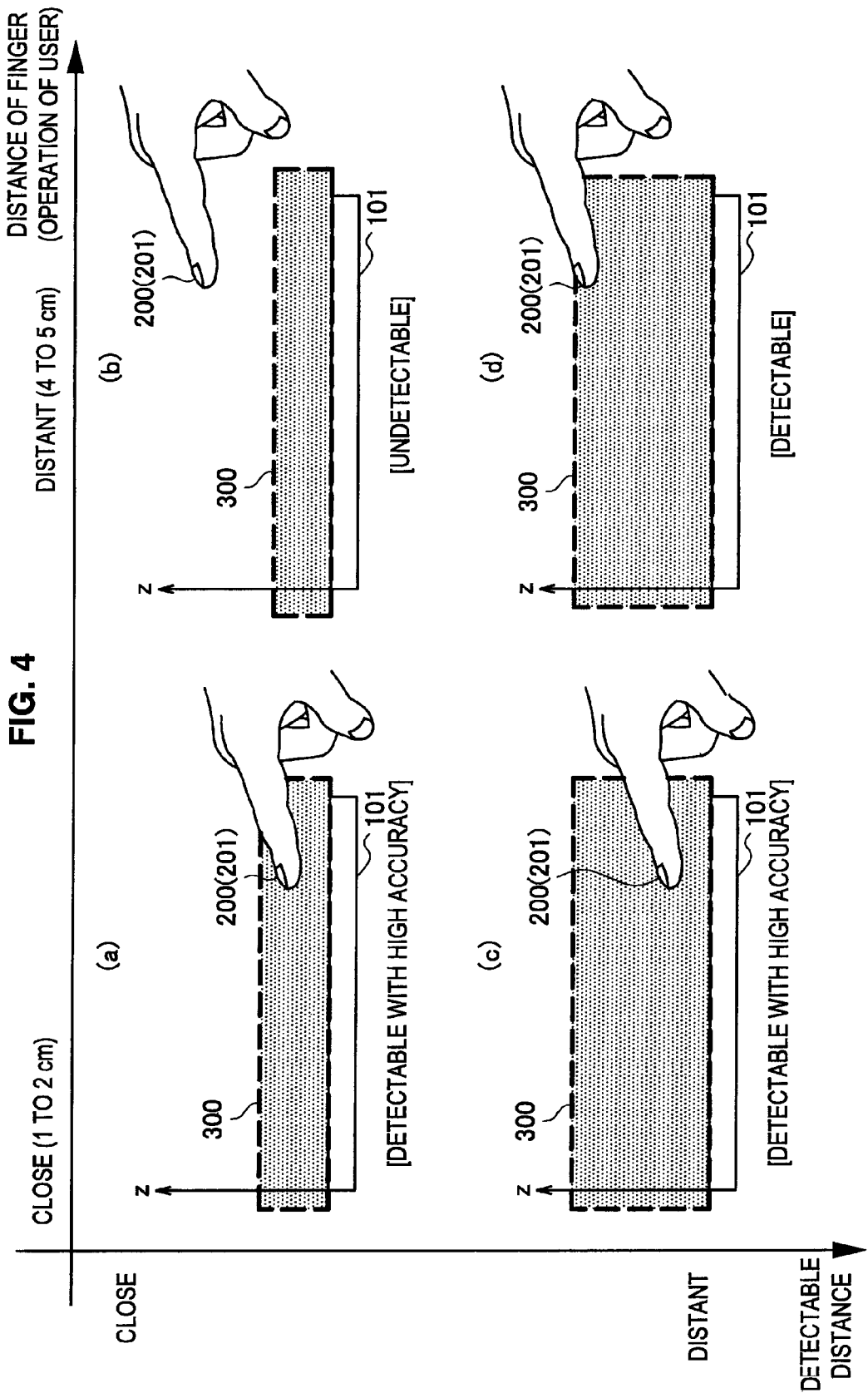
FIG. 4(a) is a side view illustrating a valid region in the related art.
FIG. 4(b) is a side view illustrating a valid region in the related art.
FIG. 4(c) is a side view illustrating a case where a valid region is widened.
FIG. 4(d) is a side view illustrating a case where a valid region is widened.

That is to say, the information processing apparatus in the related art, as shown in FIG. 4(a), determines the detection information provided from the proximity detection type touch panel 101 as being valid in a case where the user's finger tip 201 is within the valid range 300. Therefore, in this case, the information processing apparatus in the related art can detect the user's hover operation with high accuracy. On the other hand, as shown in FIG. 4(b), in a case where the user's finger tip 201 is out of the valid range 300, the information processing apparatus in the related art determines the detection information provided from the proximity detection type touch panel 101 as noise (that is, the detection information is invalid).

In addition, in the information processing apparatus in the related art, a threshold value is fixed to a very small value (specifically, 1 to 2 cm) in order to assure the detection accuracy of the proximity detection type touch panel 101. For this reason, in a case where the user's finger tip 201 exists at a position distant from the proximity detection type touch panel 101 (for example, a position away from the proximity detection type touch panel 101 by 4 to 5 cm), the information processing apparatus in the related art did not detect the hover operation. Therefore, it has been necessary for a user to put the operating body 200 such as the finger tip 201 or the palm to a proximity position in a range of 1 to 2 cm from the proximity detection type touch panel 101 in any hover operation.

As a measure for solving such a problem, for example, as shown in FIG. 4(c) and FIG. 4(d), there may be a configuration where the valid range 300 is widened (i.e., a detectable distance is lengthened). An information processing apparatus to which the measure is applied can detect a hover operation even if the user's finger tip 201 exists at a position distant from the proximity detection type touch panel 101. However, as described above, in a case where the user's finger tip 201 exists at a position distant from the proximity detection type touch panel 101, the detection information provided from the proximity detection type touch panel 101 has much noise. Therefore, there are cases where the information processing apparatus may not correctly detect a hover operation merely by widening the valid range 300.

On the other hand, a hover operation by a user is greatly divided into an accurate operation which is carefully performed while observing the display 104 and a rough operation which is generally performed. The accurate operation is performed for a relatively small object such as a text link (one word) or a button displayed on the display 104. In contrast, the rough operation is performed for a relatively large object such as an entire image, a picture image, or a map image displayed on the display 104. Even if detection positions are dispersed in such a large object, there is a high possibility that the detection positions may fall within the object.

At this time, when the detection position exists in the object, a process according to the hover operation can be accurately performed. Therefore, even if a proximity distance is long and detection positions are dispersed, a process according to the hover operation can be accurately performed when a target object is large. In addition, since the rough operation is performed in many cases without the user observing the display 104 (i.e., the operation is performed without recognition of a proximity distance), the detection information is preferably determined as being valid even if the proximity distance is long. Therefore, the information processing apparatus 1 according to the present embodiment determines whether or not a hover operation is valid based on the proximity distance and the target object. This will be described in detail below.

1-3. Functional Block of Information Processing Apparatus

Figure 5:
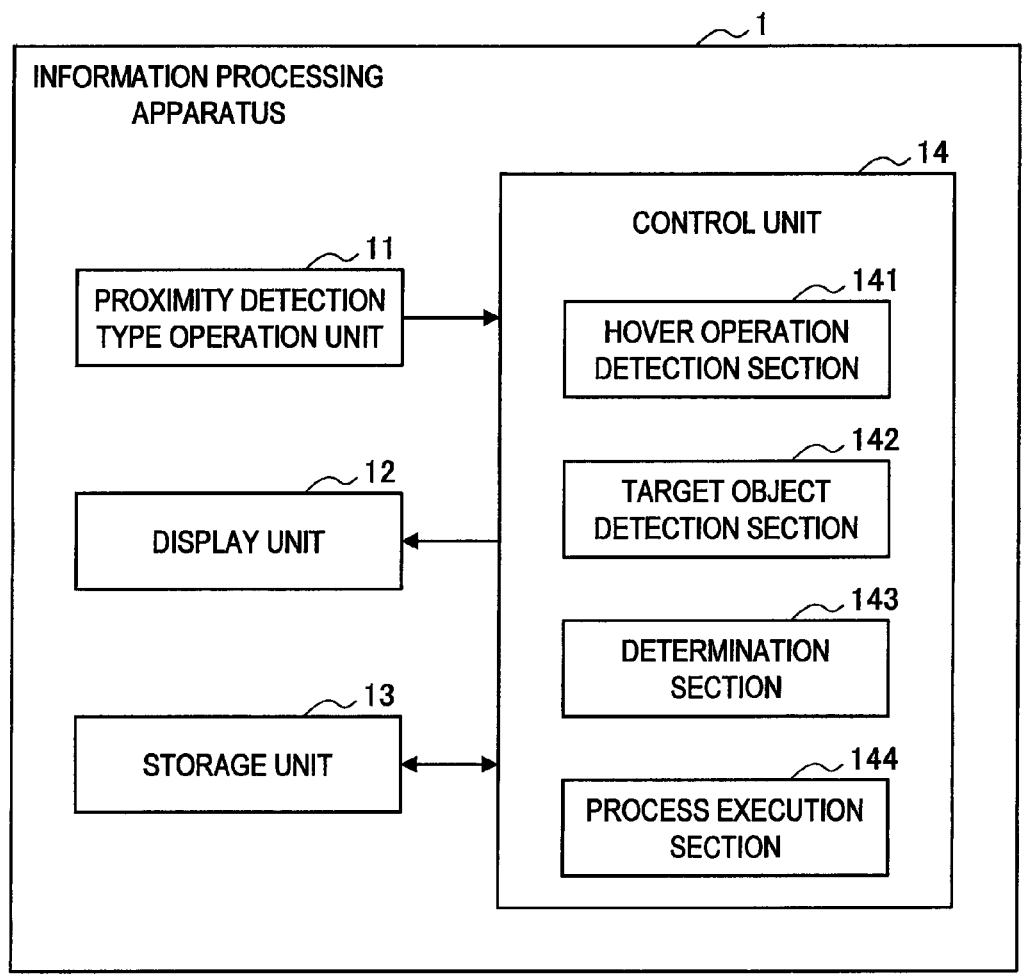
FIG. 5 is a block diagram of the information processing apparatus according to the present embodiment.

Next, a configuration of the information processing apparatus 1 will be described in terms of the functional block. The information processing apparatus 1 includes, as shown in FIG. 5, a proximity detection type operation unit 11, a display unit 12, a storage unit 13, and a control unit 14. The proximity detection type operation unit 11 corresponds to the above-described proximity detection type touch panel 101. The proximity detection type operation unit 11 provides the control unit 14 with detection information, which is related to a projection region of the operating body 200, a horizontal position of the operating body 200, and a proximity distance of the operating body 200.

The display unit 12 corresponds to the above-described display 104, and outputs (presents) a variety of image and audio information. The storage unit 13 corresponds to the above-described RAM 102 and the nonvolatile memory 103. The storage unit 13 stores a program and a variety of image and audio information. In addition, the storage unit 13 stores a detection error correspondence table. The detection error correspondence table indicates a correspondence relationship between a proximity distance of the operating body 200 and a detection error of the proximity detection type operation unit 11.

The detection error is a difference between the above-described detection position and an actual horizontal position of the operating body 200, and is given as a positive real number. The detection error is varied depending on the proximity distance. That is to say, the longer the proximity distance is, the larger the detection error is. In addition, the detection error also depends on the area (size) of a projection region or the kind of proximity detection type touch panel 101. Therefore, in the present embodiment, the detection error correspondence table is created as follows. The detection error is measured for each proximity distance of the operating body 200 in a state where a projection region of the operating body 200 detected by the proximity detection type touch panel 101, that is, a detection region is made to be constant. And then, the detection error correspondence table is created based on the measured values. The detection error correspondence table is prepared for each proximity detection type touch panel 101.

The control unit 14 includes a hover operation detection section 141, a target object detection section 142, a determination section 143, and a process execution section 144.

The hover operation detection section 141 determines whether or not a hover operation is performed based on detection information provided from the proximity detection type operation unit 11. Specifically, the hover operation detection section 141 determines whether or not a detection position is varied based on the detection information. When it is determined that the detection position is varied, the hover operation detection section 141 determines that the hover operation is performed.

The target object detection section 142 detects a target object, that is, an object which is a target of the hover operation, from an object displayed on the display unit 12. Here, a detailed determination method of the target object will be described with reference to FIGS. 6 to 8.

Figure 6:
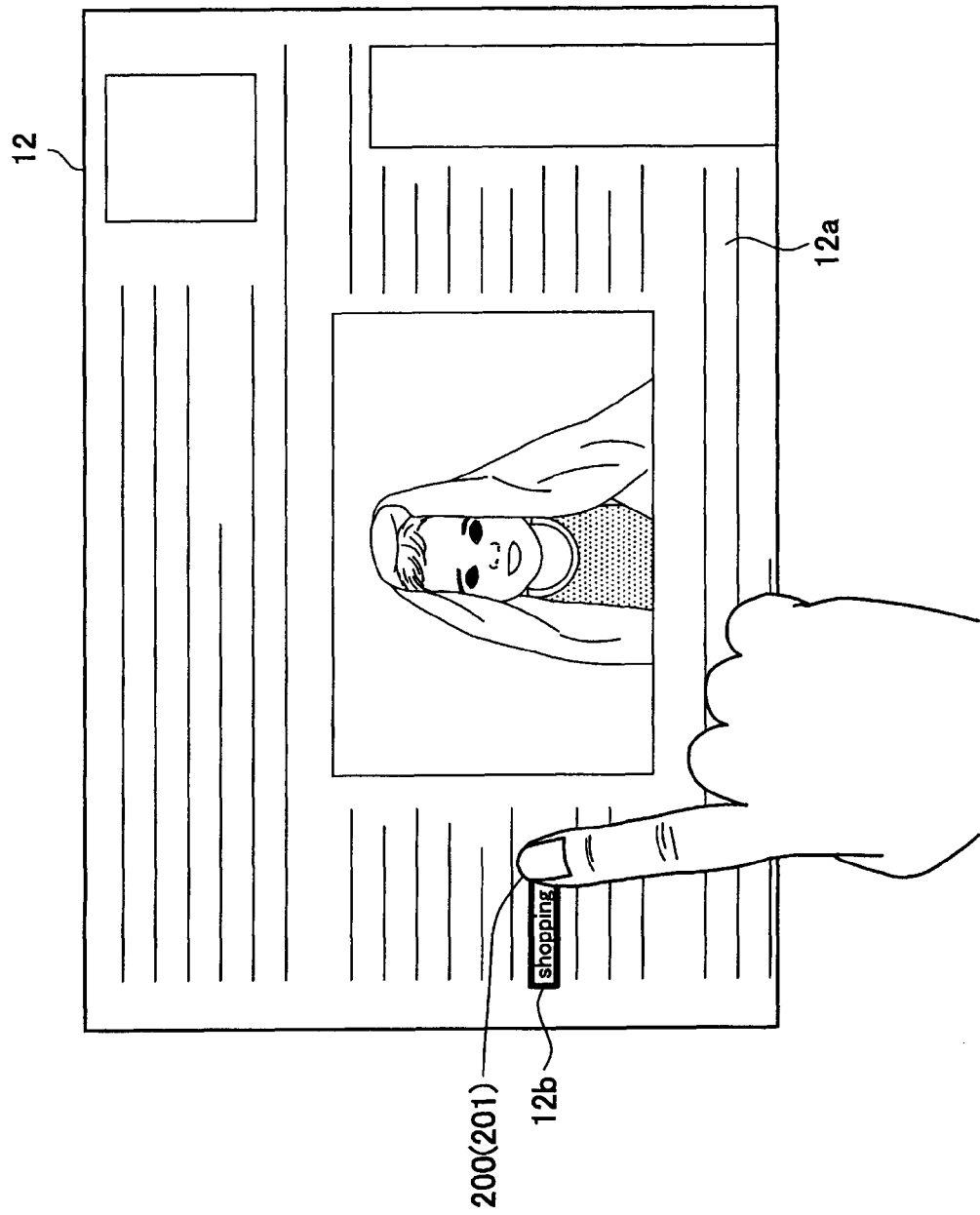
FIG. 6 is an explanatory diagram illustrating an example of a target object.
Figure 7:
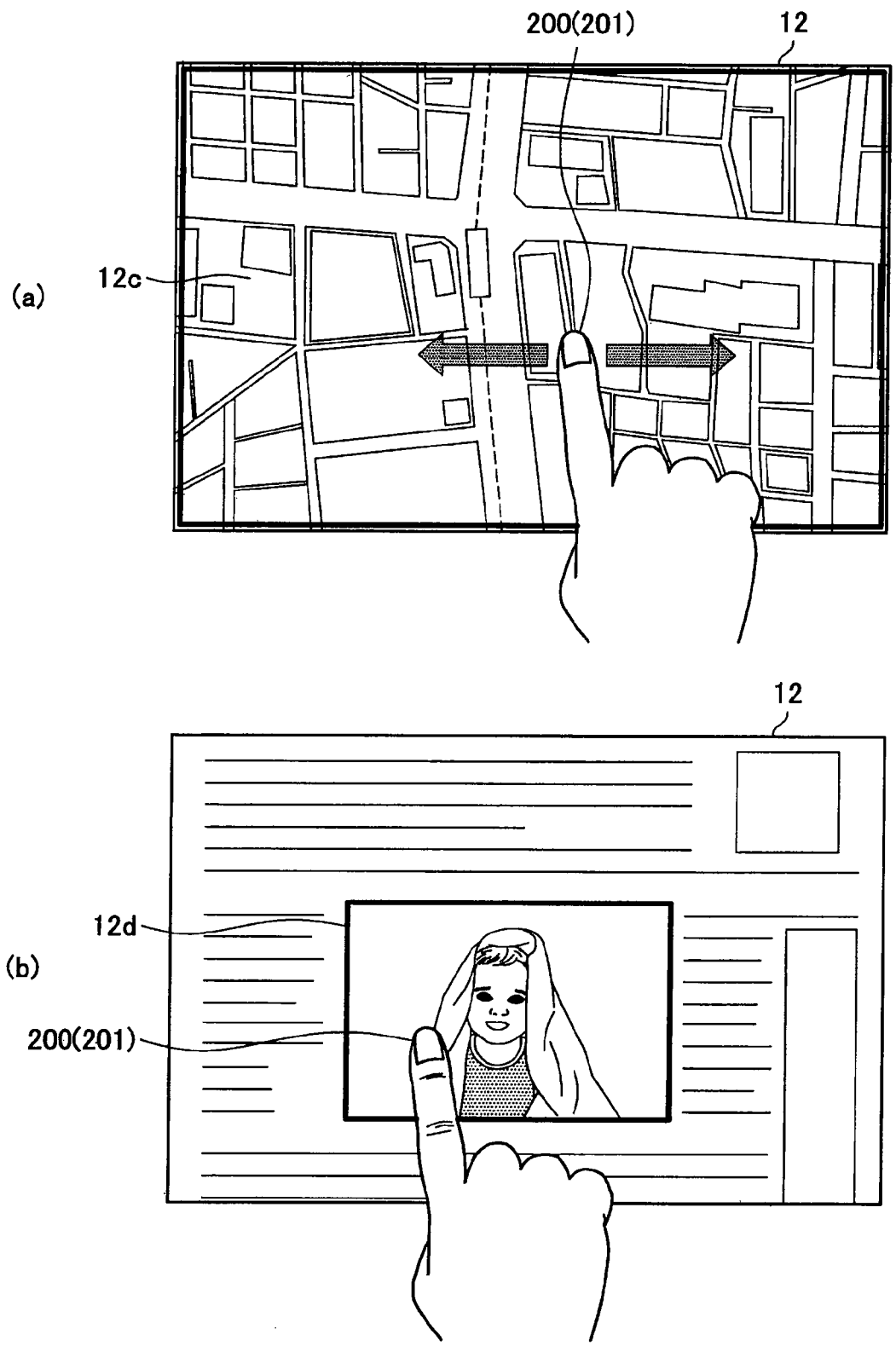
FIG. 7(a) is an explanatory diagram illustrating an example of a target object.
FIG. 7(b) is an explanatory diagram illustrating an example of a target object.
Figure 8:
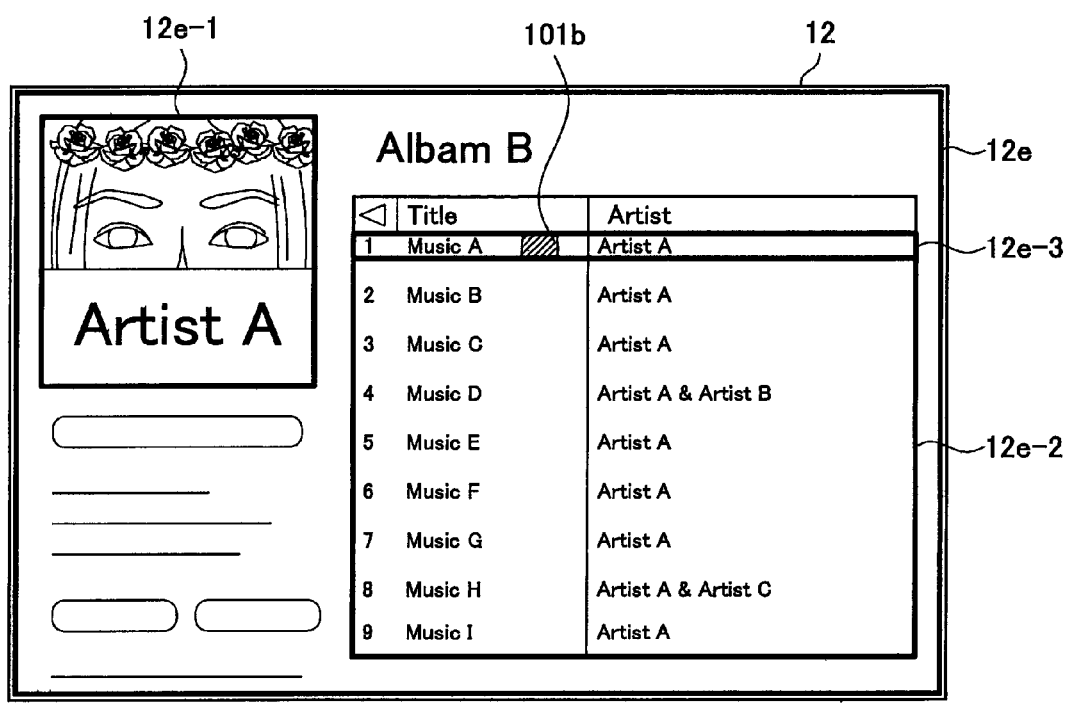
FIG. 8 is an explanatory diagram illustrating an example of a target object.

As shown in FIGS. 6 to 8, there are target objects including a relatively small target and a relatively large target. Examples of the small target object may include a text link 12b, a list item 12e-3 (a row forming a list 12e-2), a button, or the like. In a case where a target object is small, there are many cases where a user accurately (deliberately) performs a hover operation with the finger tip 201. In other words, in a case where a target object is small, the hover operation is treated as an accurate operation in many cases. In addition, in a case where a target object is small, the hover operation is performed as a mouse-over changing operation in many cases.

On the other hand, as a large target object, there may be, for example, a map image 12c, picture images 12d and 12e-1, a list 12e-2, the entire images 12a and 12e, or the like. In a case where a target object is large, there are many cases where a user roughly (in a short time) performs a hover operation with the finger tip 201 or the palm. In other words, in a case where a target object is large, the hover operation is performed as a rough operation in many cases. In addition, in a case where a target object is large, there are many cases where the hover operation is performed as a mouse-over changing operation, a switching operation of tap, a switching operation of the zoom ratio, a display/non-display switching operation of menu, a switching operation of music, an ON/OFF operation of mute, an ON/OFF operation of shuffle, or the like. In addition, the target object is changed in its size in a seamless manner through a change of the zoom ratio.

As such, there is a correspondence relationship among a size of the target object, time necessary for the hover operation, and a size of the operating body 200. In other words, the larger the target object is, the shorter time necessary for the hover operation is, and the operating body 200 becomes larger. Therefore, the target object detection section 142 determines a target object on the basis of time necessary for the hover operation and a size of the operating body 200. Specifically, the target object detection section 142 determines a target object on the basis of a period of time during which the operating body 200 is in a hold state, a detection position, and a size of a detection region.

Specifically, the target object detection section 142 recognizes a detection position and a detection region on the basis of detection information. In addition, the target object detection section 142 sets a period of time during which both the detection position and the detection region are constant as a hold time. Further, the target object detection section 142 sets an object existing on a detection position as a candidate object and sets the entire image as an initial value of the candidate object. The target object detection section 142 reduces the candidate object in a stepwise manner from the entire image whenever the hold time exceeds a predetermined time (for example, 0.5 seconds). And then, the target object detection section 142 determines the candidate object at a time point when the hold state is released (that is, a time point when at least one of the detection position or the detection region is varied), as a target object. In a case where the candidate object is the smallest object including the detection region, the target object detection section 142 determines the candidate object as a target object.

For example, in a case where the region 101b shown in FIG. 8 is a detection region, the target object detection section 142 sets the entire image 12e as an initial value of the candidate object. The target object detection section 142 determines the entire image 12e as a target object in a case where the hold state is released before hold time exceeds 0.5 seconds. On the other hand, in a case where the hold time exceeds 0.5 seconds, the target object detection section 142 sets the list 12e-2 as a candidate object. In addition, the picture image 12e-1 does not include the detection region 101b, and thus the picture image does not become a candidate object.

In a case where the hold state is released before the hold time exceeds another 0.5 seconds, the target object detection section 142 determines the list 12e-2 as a target object. On the other hand, when the hold time exceeds another 0.5 seconds, the target object detection section 142 sets the list item 12e-3 as a candidate object. The target object detection section 142 determines the list item 12e-3 as a target object since a smaller candidate object is not present any more.

In addition, the target object detection section 142 may determine a target object only on the basis of a period of time which during the operating body 200 is in a hold state and a detection position regardless of a size of the detection region. In this case, the target object detection section 142 sets an object existing on the detection position as a candidate object and sets the entire image as an initial value of the candidate object. The target object detection section 142 reduces the candidate object in a stepwise manner from the entire image whenever the hold time exceeds a predetermined time. The target object detection section 142 determines the candidate object at a time point when the hold state is released as a target object. In a case where the candidate object is the smallest object of objects displayed on the display unit 12, the target object detection section 142 determines the candidate object as a target object.

In a similar manner, the target object detection section 142 may determine a target object only on the basis of a size of the detection region and a detection position regardless of a period of time which during the operating body 200 is in a hold state. In this case, the target object detection section 142 determines any one object (for example, the largest object) of objects including the entire detection region as a target object.

The determination section 143 determines whether or not a hover operation is valid on the basis of a proximity distance and a target object. Specifically, the determination section 143 recognizes a detection error according to a proximity distance of the operating body 200 on the basis of the detection information and the detection error correspondence table. Further, the determination section 143 calculates a square root of the area of the detection region on the basis of the detection information. In addition, the determination section 143 calculates a determination value shown in the following Expression (1).

$$L = k \times A + B \qquad (1)$$

L: determination value
k: square root of the area of a projection region
A: detection error
B: given weight The determination section 143 determines that a hover operation by the user is valid in a case where the determination value and a short side length of the target object satisfy any one of the following Expressions (2) to (4). In addition, in the following Expressions (2) to (4), L1 and L2 are predefined values for the determination value, and satisfy a relationship of L1<L2. In addition, M indicates a short side length of the target object. Further, if a target object has a shape (for example, a circle) other than a rectangular shape, the determination section 143 defines a rectangular image including the target object, and sets a short side length of the rectangular image as a short side length of the target object. M1 and M2 are predefined values for the short side length of the target object, and satisfy a relationship of M1<M2.

$$L < L1 \text{ and } 0 < M < M1 \qquad (2)$$

$$L < M \text{ and } M1 \leq M < M2 \qquad (3)$$

$$L < L2 \text{ and } M2 \leq M \qquad (4)$$

Figure 9:
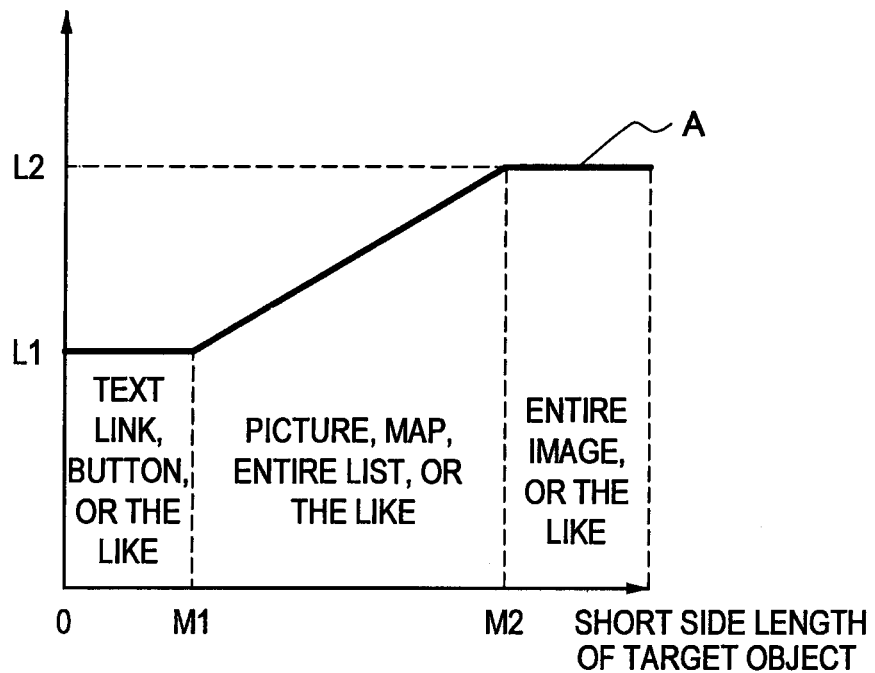
FIG. 9 is a graph illustrating a correspondence relationship between a determination value and a short side length of a target object.

The graph A shown in FIG. 9 indicates a correspondence relationship between a short side length of the object and a determination value satisfying Expressions (2) to (4). As shown in FIG. 9, a case where the short side length M of the target object satisfies 0<M<M1 is, for example, when the target object is a text link or a button. In addition, a case where the short side length M of the target object satisfies M1≤M<M2 is, for example, when the target object is a picture image, a map image, or a list. Further, a case where the short side length M of the target object satisfies M2≤M is, for example, when the target object is the entire image.

Figure 11:
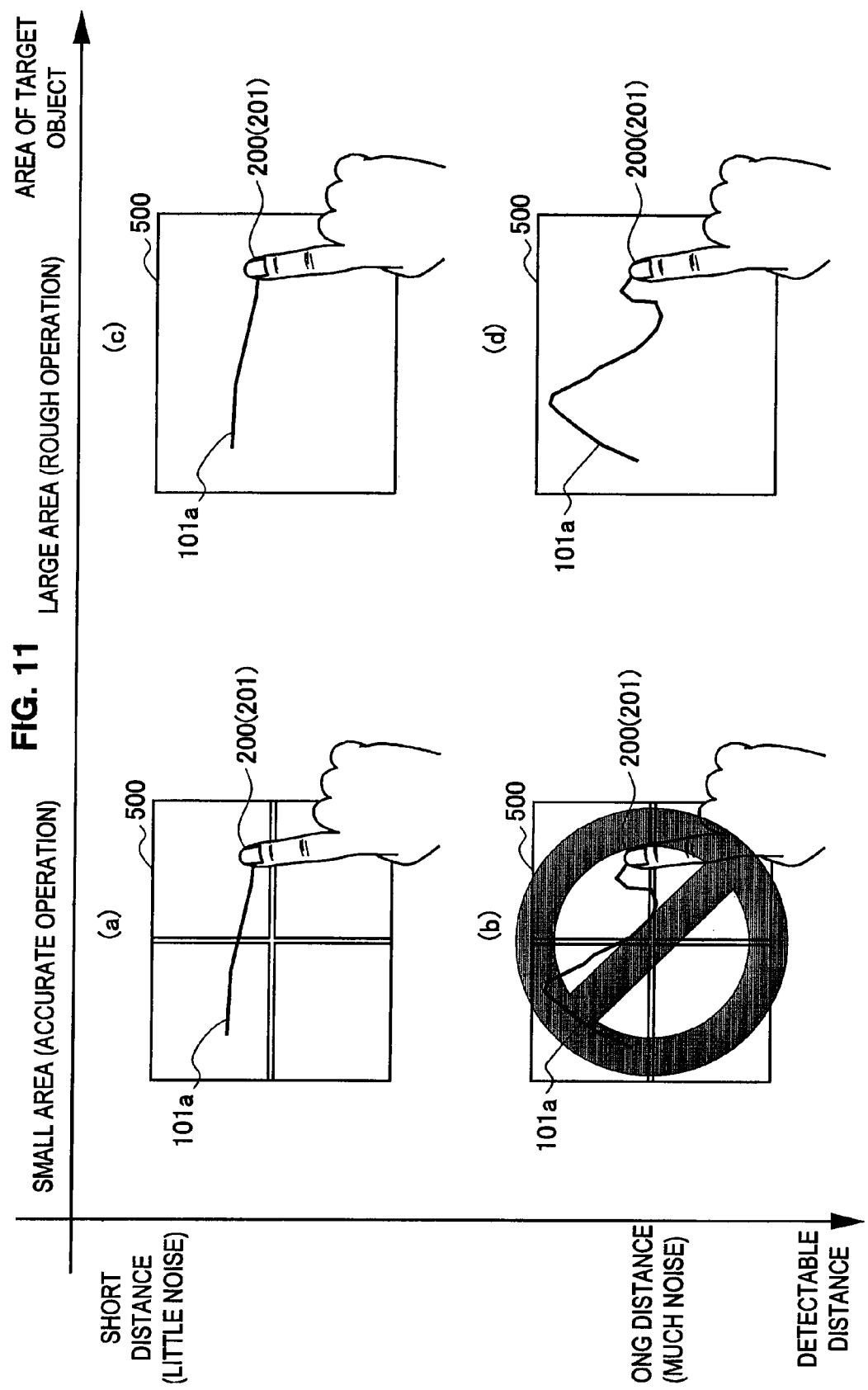
FIG. 11(a) is a plan view illustrating a case where an accurate operation is performed for a small target object.
FIG. 11(b) is a plan view illustrating a case where an accurate operation is performed for a small target object.
FIG. 11(c) is a plan view illustrating a case where a rough operation is performed for a large target object.
FIG. 11(d) is a plan view illustrating a case where a rough operation is performed for a large target object.

According to Expressions (2) to (4) and the graph A, as shown in FIG. 10(a), the smaller the target object is, the smaller the valid range 300 is (that is, a detectable distance becomes shorter). For this reason, as shown in FIG. 10(a) and FIG. 11(a), in a case where a target object 500 is small and a proximity distance is short, a hover operation by a user is determined as being valid. For example, in a case where the user accurately performs the hover operation at a position which is sufficiently close to the proximity detection type operation unit 11, the hover operation is determined as being valid. In this case, a trajectory 101a of the detection positions nearly matches with the actual trajectory of the finger tip 201, and thus falls within the target object 500. Therefore, the process execution section 144 described later can correctly determine a process for the target object 500.

In addition, as shown in FIG. 10(a) and FIG. 11(b), in a case where the target object 500 is small and the proximity distance is long (that is, in a case where the finger tip 201 is in an invalid region 400), a hover operation by the user is determined as being invalid. For example, even if the user accurately performs the hover operation at a position away from the proximity detection type operation unit 11, the hover operation is determined as being invalid. In this case, the trajectory 101a of the detection position is considerably deviated from the actual trajectory of the finger tip 201, and is thus considerably deviated from the target object 500. Therefore, the determination section 143 can exclude the hover operation in a case where the trajectory 101a of the detection position is considerably deviated from the target object 500.

On the other hand, according to Expressions (2) to (4) and the graph A, as shown in FIG. 10(b), the larger the target object is, the larger the valid range 300 is (that is, a detectable distance becomes longer). For this reason, as shown in FIG. 10(b) and FIG. 11(c), in a case where the target object 500 is large and the proximity distance is short, a hover operation by the user is determined as being valid. For example, in a case where the user roughly performs the hover operation at a position which is sufficiently close to the proximity detection type operation unit 11, the hover operation is determined as being valid. In this case, a trajectory 101a of the detection position nearly matches with the actual trajectory of the finger tip 201, and thus falls within the target object 500. Therefore, the process execution section 144 described later can correctly determine a process for the target object 500.

In addition, as shown in FIG. 10(b) and FIG. 11(d), even in a case where a target object 500 is large and a proximity distance is long, a hover operation by the user is determined as being valid. For example, even in a case where the user roughly performs the hover operation at a position away from the proximity detection type operation unit 11, the hover operation is determined as being valid. In this case, the trajectory 101a of the detection position is considerably deviated from the actual trajectory of the finger tip 201, but since the target object 500 is large, the trajectory 101a of the detection position falls within the target object 500. Therefore, the process execution section 144 described later can correctly determine a process for the target object 500.

According to Expressions (1) to (4), as a value of the weight B is larger, a value of k×A is necessary to be smaller. Therefore, the weight B is determined depending on accuracy or the like necessary for the information processing apparatus 1. In other words, the higher accuracy necessary for the information processing apparatus 1 is, the larger a value of the weight B is.

The process execution section 144 performs a process according to a hover operation when the hover operation is determined as being valid. Specifically, first, the process execution section 144 recognizes a trajectory of the detection positions in the target object on the basis of the detection information. Next, the process execution section 144 determines a process for the hover operation on the basis of the recognized trajectory.

For example, the process execution section 144 determines the process as follows. In other words, in a case where the target object is small, the process execution section 144 recognizes in which direction a user performs the hover operation for the target object, on the basis of the trajectory of the detection positions in the target object. In addition, the process execution section 144 performs a process according to the direction of the hover operation.

Figure 12:
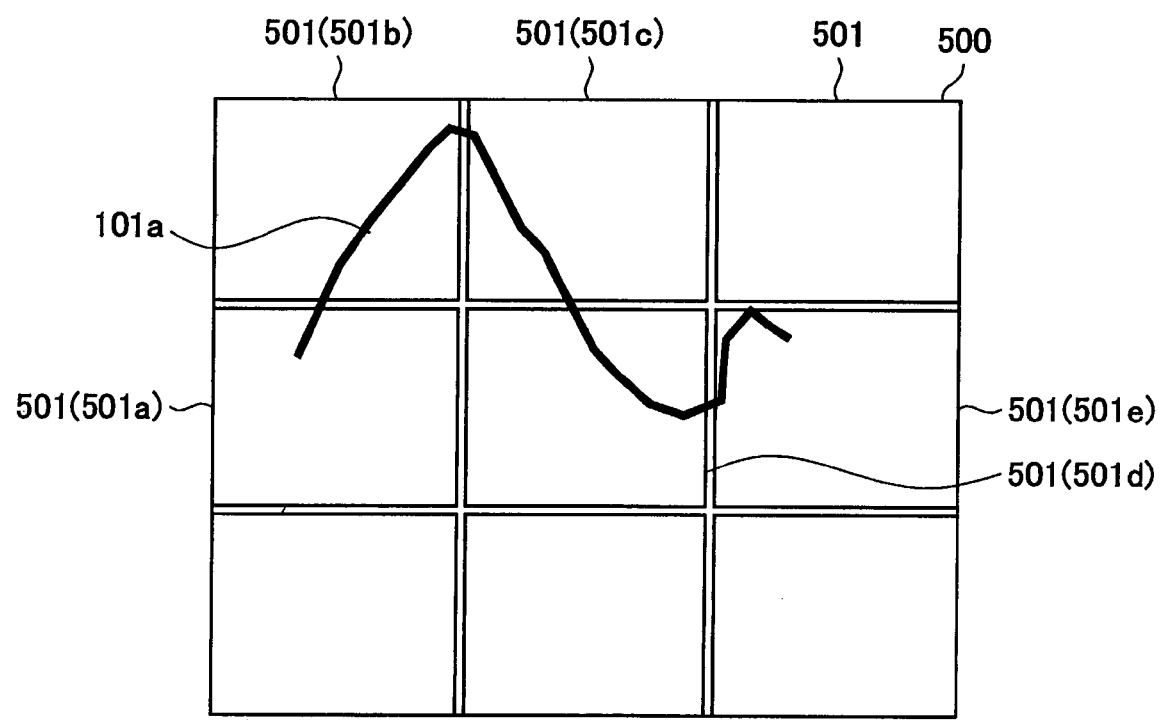
FIG. 12 is a plan view illustrating a case where a direction of the hover operation is detected.

On the other hand, in a case where the target object is large, the process execution section 144 divides the target object 500 into a plurality of blocks 501 as shown in FIG. 12. In addition, the process execution section 144 recognizes an order where the trajectory 101a of the detection positions passes through the blocks 501. And then, the process execution section 144 recognizes in which direction the user performs the hover operation for the target object 500 on the basis of the recognized order. In the example shown in FIG. 12, since the trajectory 101a of the detection positions passes in an order of a block 501a, a block 501b, a block 501c, a block 501d, and a block 501e, the process execution section 144 recognizes that the user performs the hover operation for the target object 500 rightward. In addition, the process execution section 144 performs a process according to the direction of the hover operation. As such, the process execution section 144 can correctly perform a process for the hover operation if the trajectory of the detection positions falls within the target object.

2. Procedures of Process Performed by Information Processing Apparatus

Figure 13:
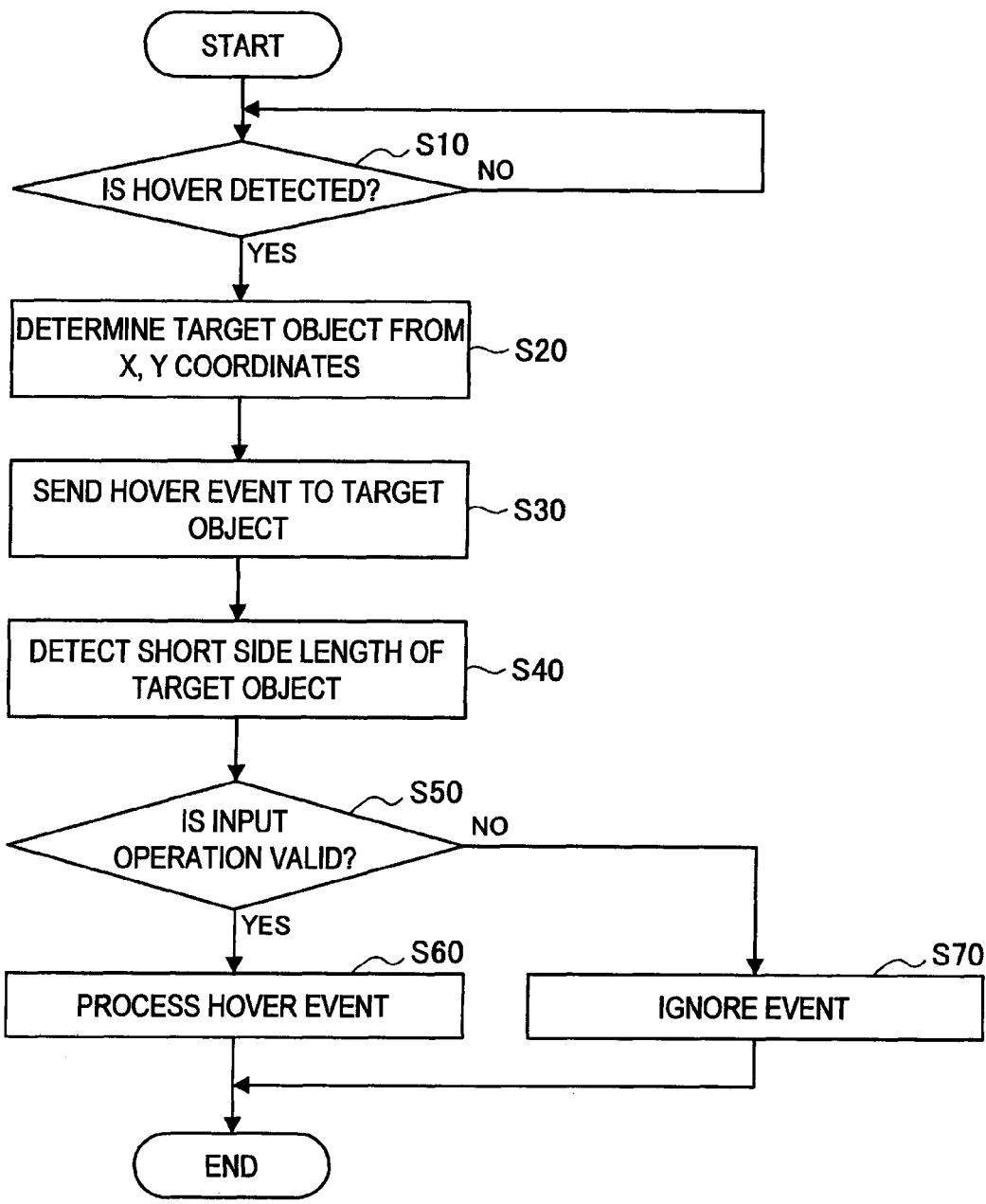
FIG. 13 is a flowchart illustrating procedures of a process performed by the information processing apparatus.

Next, procedures of a process performed by the information processing apparatus 1 will be described with reference to FIG. 13. In addition, it is assumed that the proximity detection type operation unit 11 normally outputs detection information to the control unit 14 while the following process is performed.

In step S10, the hover operation detection section 141 determines whether or not a hover operation is performed on the basis of detection information provided from the proximity detection type operation unit 11. Specifically, the hover operation detection section 141 determines whether or not a detection position is varied on the basis of the detection information, and determines that the hover operation is performed if it is determined that the detection position is varied. The hover operation detection section 141 waits until a hover operation is performed, and if it is determined that the hover operation is performed, the flow proceeds to step S20.

In step S20, the target object detection section 142 detects (determines) a target object on the basis of the detection information. Specifically, the target object detection section 142 recognizes a detection position (x and y coordinates) and a detection region on the basis of the detection information. In addition, the target object detection section 142 sets a period of time which during the detection position and the detection region are constant as a hold time. Next, the target object detection section 142 sets an object existing on the detection position as a candidate object, and sets the entire image as an initial value of the candidate object. The target object detection section 142 reduces the candidate object in a stepwise manner from the entire image whenever the hold time exceeds a predetermined time. Next, the target object detection section 142 determines the candidate object at a time point when the hold state is released as a target object. In a case where the candidate object is the smallest object including the detection region, the target object detection section 142 determines the candidate object as a target object.

In step S30, the target object detection section 142 sends the hover operation (hover event) to the target object. In other words, the target object detection section 142 correlates the target object with the detection information.

In step S40, the determination section 143 detects a short side length of the target object. In step S50, the determination section 143 recognizes a detection error according to the proximity distance of the operating body 200 on the basis of the detection information and the detection error correspondence table. Further, the determination section 143 calculates a square root of the area of the detection region on the basis of the detection information. Next, the determination section 143 calculates a determination value shown in the above-described Expression (1).

Next, the determination section 143 determines whether or not the hover operation is valid (i.e., whether or not the determination value and the short side length of the target object satisfy any one of the above-described Expressions (2) to (4)). If the determination section 143 determines that the hover operation is valid (i.e., the determination value and the short side length of the target object satisfy any one of Expressions (2) to (4)), the flow proceeds to step S60. On the other hand, if the determination section 143 determines that the hover operation is invalid (i.e., the determination value and the short side length of the target object do not satisfy any of Expressions (2) to (4)), the flow proceeds to step S70.

In step S60, the process execution section 144 processes the hover operation (hover event). Specifically, first, the process execution section 144 recognizes a trajectory of the detection position in the target object on the basis of the detection information. Next, the process execution section 144 determines a direction of the hover operation on the basis of the recognized trajectory. Thereafter, the process execution section 144 performs a process according to the direction of the hover operation. Next, the information processing apparatus 1 finishes the process. On the other hand, in step S70, the process execution section 144 ignores the hover operation (hover event). Thereafter, the information processing apparatus 1 finishes the process.

As described above, the information processing apparatus 1 according to the present embodiment determines whether or not a hover operation is valid on the basis of the proximity distance and the target object. Therefore, the information processing apparatus 1 can adjust a proximity distance where a hover operation is to be valid, that is, a detectable distance according to a target object, and thus it is possible to improve the operability of the proximity detection type operation unit 11. For example, the information processing apparatus 1 may determine a hover operation as being valid even if the proximity distance is long in a case where the target object is large. Thus, even in a case where a user performs a rough hover operation without observing the display unit 12 carefully, the information processing apparatus 1 may determine the hover operation as being valid.

In addition, the information processing apparatus 1 determines whether or not a hover operation is valid on the basis of the proximity distance and the size of the target object. Therefore, the information processing apparatus 1 can adjust a detectable distance according to the size of the target object, and thus it is possible to improve the operability of the proximity detection type operation unit 11. For example, the information processing apparatus 1 may make the detectable distance longer as the target object is larger.

In addition, the information processing apparatus 1 determines whether or not a hover operation is valid on the basis of the detection error of the proximity detection type operation unit 11 with respect to the proximity distance, the size of the target object, and the projection region of the operating body 200 onto the proximity detection type operation unit 11. Therefore, the information processing apparatus 1 can adjust a detectable distance according to the size of the target object and the projection region of the operating body 200 onto the proximity detection type operation unit 11, and thus it is possible to improve the operability of the proximity detection type operation unit 11. For example, the information processing apparatus 1 may make the detectable distance longer as the target object is larger and the projection region of the operating body 200 onto the proximity detection type operation unit 11 is smaller.

The information processing apparatus 1 may determine that a hover operation is valid in a case where the proximity distance and the short side length of the target object satisfy any one of the above-described Expressions (2) to (4). Therefore, the information processing apparatus 1 can correctly determine whether or not a hover operation is valid. Further, the information processing apparatus 1 can adjust a detectable distance according to the short side length of the target object and the square root of the area of the projection region.

In addition, the information processing apparatus 1 detects a target object on the basis of at least one of a period of time which during the operating body 200 is in a hold state or the projection region of the operating body 200 onto the proximity detection type operation unit 11. Therefore, the information processing apparatus 1 can correctly detect a target object.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

An information processing apparatus comprising:

a determination section for determining whether or not an input operation is valid on the basis of a proximity distance and a target object, the proximity distance being a distance between a proximity detection type operation unit and an operating body performing the input operation by using the proximity detection type operation unit, and the target object being a target of the input operation; and a process execution section for executing a process according to the input operation when it is determined that the input operation is valid.

(2)

The information processing apparatus according to (1), wherein the determination section determines whether or not the input operation by the operating body is valid on the basis of the proximity distance and a size of the target object.

(3)

The information processing apparatus according to (2), wherein the determination section determines whether or not the input operation by the operating body is valid on the basis of a detection error of the proximity detection type operation unit with respect to the proximity distance, a size of the target object, and a projection region of the operating body onto the proximity detection type operation unit.

(4)

The information processing apparatus according to (3), wherein the determination section determines that the input operation by the operating body is valid if the following Expression (1) is satisfied.

$$M > k \times A + B \quad (1)$$

M: a short side length of the target object
k: a square root of the area of the projection region
A: the detection error
B: given weight (5)

The information processing apparatus according to any one of (1) to (4), further comprising a target object detection section for detecting the target object on the basis of a position of the operating body and at least one of a period of time during which the operating body is in a hold state or a projection region of the operating body onto the proximity detection type operation unit.

(6)

An information processing method comprising:
determining whether or not an input operation is valid on the basis of a proximity distance and a target object, the proximity distance being a distance between a proximity detection type operation unit and an operating body performing the input operation by using the proximity detection type operation unit, and the target object being a target of the input operation; and
executing a process according to the input operation when it is determined that the input operation is valid.

(7)

A program for causing a computer to implement:
a determination function of determining whether or not an input operation is valid on the basis of a proximity distance and a target object, the proximity distance being a distance between a proximity detection type operation unit and an operating body performing the input operation by using the proximity detection type operation unit, and the target object being a target of the input operation; and
a process execution function of executing a process according to the input operation when it is determined that the input operation is valid.

(8)

The program according to (7), wherein the determination function includes determining whether or not the input operation by the operating body is valid on the basis of the proximity distance and a size of the target object.

(9)

The program according to (8), wherein the determination function includes determining whether or not the input operation by the operating body is valid on the basis of a detection error of the proximity detection type operation unit with respect to the proximity distance, a size of the target object, and a projection region of the operating body onto the proximity detection type operation unit.

(10)

The program according to (9), wherein the determination function includes determining that the input operation by the operating body is valid if the following Expression (1) is satisfied.

$$M > k \times A + B \quad (1)$$

M: a short side length of the target object
k: a square root of the area of the projection region
A: the detection error
B: given weight (11)

The program according to any one of (7) to (10), the program being adapted to further cause the computer to implement a target object detection function of detecting the target object on the basis of a position of the operating body and at least one of a period of time during which the operating body is in a hold state or a projection region of the operating body onto the proximity detection type operation unit.

The present disclosure contains subject matter related to that disclosed in Japanese Priority Patent Application JP 2011-117990 filed in the Japan Patent Office on May 26, 2011, the entire content of which is hereby incorporated by reference.

What is claimed is:

1. An information processing apparatus comprising:
a determination section for determining whether or not an input operation is valid on the basis of a proximity distance and a target object, the proximity distance being a distance between a proximity detection type operation unit and an operating body performing the input operation by using the proximity detection type operation unit, and the target object being a target of the input operation; and
a process execution section for executing a process according to the input operation when it is determined that the input operation is valid,
wherein the determination section determines whether or not the input operation by the operating body is valid on the basis of the proximity distance and a size of the target object.

2. The information processing apparatus according to claim 1, wherein the determination section determines whether or not the input operation by the operating body is valid on the basis of a detection error of the proximity detection type operation unit with respect to the proximity distance, a size of the target object, and a projection region of the operating body onto the proximity detection type operation unit.

3. The information processing apparatus according to claim 2, wherein the determination section determines that the input operation by the operating body is valid if the following Expression (1) is satisfied $$M > k \times A + B \quad (1)$$

M: a short side length of the target object
k: a square root of the area of the projection region
A: the detection error
B: given weight.

4. The information processing apparatus according to claim 1, further comprising a target object detection section for detecting the target object on the basis of a position of the operating body and at least one of a period of time during which the operating body is in a hold state or a projection region of the operating body onto the proximity detection type operation unit.

5. An information processing method comprising:
determining whether or not an input operation is valid on the basis of a proximity distance and a target object, the proximity distance being a distance between a proximity detection type operation unit and an operating body performing the input operation by using the proximity detection type operation unit, and the target object being a target of the input operation; and executing a process according to the input operation when it is determined that the input operation is valid, wherein the determining includes determining whether or not the input operation by the operating body is valid on the basis of the proximity distance and a size of the target object.

6. A non-transitory computer-readable medium having embodied thereon a program, which when executed by a computer causes the computer to implement:

a determination function of determining whether or not an input operation is valid on the basis of a proximity distance and a target object, the proximity distance being a distance between a proximity detection type operation unit and an operating body performing the input operation by using the proximity detection type operation unit, and the target object being a target of the input operation; and a process execution function of executing a process according to the input operation when it is determined that the input operation is valid, wherein the determination function includes determining whether or not the input operation by the operating body is valid on the basis of the proximity distance and a size of the target object.

7. The non-transitory computer-readable medium according to claim 6, wherein the determination function includes determining whether or not the input operation by the operating body is valid on the basis of a detection error of the proximity detection type operation unit with respect to the proximity distance, a size of the target object, and a projection region of the operating body onto the proximity detection type operation unit.

8. The non-transitory computer-readable medium according to claim 7, wherein the determination function includes determining that the input operation by the operating body is valid if the following Expression (1) is satisfied, $$M > k + A + B \tag{1}$$

M: a short side length of the target object
k: a square root of the area of the projection region
A: the detection error
B: given weight.

9. The non-transitory computer-readable medium according to claim 6, the program being adapted to further cause the computer to implement a target object detection function of detecting the target object on the basis of a position of the operating body and at least one of a period of time during which the operating body is in a hold state or a projection region of the operating body onto the proximity detection type operation unit.

10. The information processing apparatus according to claim 1, wherein at least one of the determination section and the process execution section is implemented via a processor.

11. The information processing method according to claim 5, wherein the determining includes determining whether or not the input operation by the operating body is valid on the basis of a detection error of the proximity detection type operation unit with respect to the proximity distance, a size of the target object, and a projection region of the operating body onto the proximity detection type operation unit.

12. The information processing method according to claim 11, wherein the determining includes determining that the input operation by the operating body is valid if the following Expression (1) is satisfied $$M > k + A + B \tag{1}$$

M: a short side length of the target object
k: a square root of the area of the projection region
A: the detection error
B: given weight.

13. The information processing method according to claim 5, further comprising detecting the target object on the basis of a position of the operating body and at least one of a period of time during which the operating body is in a hold state or a projection region of the operating body onto the proximity detection type operation unit.

* * * * *